| United States Patent [19] | [11] Patent Number: 5,006,964 |
|---|---|
| Ross et al. | [45] Date of Patent: Apr. 9, 1991 |

[54] LOW RESISTIVITY LOW ESR CAPACITOR ELECTROLYTE

[75] Inventors: Sidney D. Ross, Williamstown; Manuel Finkelstein, North Adams, both of Mass.

[73] Assignee: Sprague Electric Company, North Adams, Mass.

[21] Appl. No.: 516,996

[22] Filed: Apr. 30, 1990

[51] Int. Cl.$^5$ ............................................... H01G 9/02
[52] U.S. Cl. ..................................... 361/504; 252/62.2
[58] Field of Search ................ 361/504, 525; 252/62.2

[56] References Cited

U.S. PATENT DOCUMENTS 2,024,210 12/1935 Edelman ............................ 175/315
4,915,861 4/1990 Yokoyama et al. ................ 252/62.2

OTHER PUBLICATIONS

F. J. Burger et al., "Dielectric Breakdown in Electrolytic Capacitors", Extended Abstracts of the Electrochemical Society, #3, pp. 13–16, May 1970.

*Primary Examiner*—Donald A. Griffin

[57] ABSTRACT

A phthalate electrolyte containing benzil provides aluminum electrolytic capacitors having low equivalent series resistance and low rates of change in equivalent series resistance with time on voltage.

4 Claims, No Drawings

LOW RESISTIVITY LOW ESR CAPACITOR ELECTROLYTE

BACKGROUND OF THE INVENTION

1. The Field

This invention relates to capacitor electrolytes which have low resistivities and which provide low stable equivalent series resistance (ESR) during operation of aluminum electrolytic capacitors. More particularly, this invention relates to a phthalate electrolyte containing benzil which provides low ESR and low rates of change in ESR during operation of aluminum electrolytic capacitors.

2. Prior Teachings

There is a growing need for working electrolytes in low-voltage electrolytic capacitors that have low resistivities and provide low stable ESRs during operation of the capacitor. There is a limit to how low a resistivity in an electrolyte can be tolerated in a capacitor. The maximum operating voltage for an electrolytic capacitor is directly related to the electrolyte resistivity: in general, the lower the resistivity the lower the operating voltage.

Burger and Wu (Extended Abstracts of the Electrochemical Society #3, p. 13, May 1970) suggest that it should be possible to develop low voltage capacitors having low and stable ESR values by using very low resistivity working electrolytes (10 ohm-cm to 100 ohm-cm). Even at 10 ohm-cm this relationship predicts a sparking voltage (Vsp) of 260 V, and a capacitor with a 10 ohm-cm working electrolyte might reasonably be expected to operate effectively at a voltage as high as 100 V, and certainly at an applied voltage of 50 V.

SUMMARY OF THE INVENTION

We have found that largely non-aqueous electrolyte systems, where a resistivity as low as 10 ohm-cm at 25° is not available, permit electrolytes with resistivities of approximately 100 ohm-cm at 25°.

An electrolyte for aluminum electrolytic capacitors providing low and stable ESR's is obtained by utilizing about 1 wt. % benzil with a phthalate electrolyte in a non-aqueous solvent.

The Table below presents the formulations and properties for two experimental electrolytes, A and B. These two working electrolytes differ only in the presence of 1% by wt. of benzil in Electrolyte B and its absence in A. It is to be noted that the observed Vmax values for A and B are well below the limiting Vsp value of 130 V predicted by Burger and Wu for very low resistivity working electrolytes.

TABLE

| Composition and Properties of Electrolytes A and B | | |
|---|---|---|
| | A | B |
| Composition % by Wt. | | |
| Tetramethylammonium hydrogen phthalate | 22.0 | 22.0 |
| Water | 1.0 | 1.0 |
| Benzil | — | 1.0 |
| α-Butyrolactone (BLO) | 77.0 | 76.0 |
| Electrical Properties | | |
| Ohm-cm at 25° | 93.4 | 96.6 |
| Vmax at 85° | 76 | 77 |

Significant are the differences observed in the properties of units containing electrolyte A and of units containing electrolyte B. These two electrolytes differ only in the presence of 1% benzil in electrolyte B and its absence in electrolyte A, but the differences in performance on life test at 105° C. are striking. For the 6.3 VDC units, those containing electrolyte A show a 15.6% increase in ESR after 500 hrs. and 20.2% increase after 1000 hrs. In contrast for the 6.3 VDC capacitors impregnated with electrolyte B the percentage changes in ESR are +0.5% after 500 hrs and +1.5% after 1000 hrs. For the 16 VDC units impregnated with electrolyte A, the percentage changes in ESR are +20.2% after 500 hrs. and +21.8% after 1000 hrs. In contrast the units containing electrolyte B show only a 0.6% increase after 500 hrs. and 1.2% increase after 1000 hrs. Both sets of units containing electrolyte B thus have a low ESR that is very nearly constant with time on life test at 105°.

Other capacitor ratings show equally beneficial effects on ESR from the presence of benzil in electrolyte B. These results are summarized in the Table. The role played by benzil in electrolyte B is uncertain, but related to the recognition that Benzil is an easily reducible organic compound containing two polar carbonyl groups.

TABLE

Changes in ESR on Life Test at 105° C. for Capacitors Impregnated with Electrolyte A and with Electrolyte B

| | | % Change in ESR | |
|---|---|---|---|
| Unit Rating | Test Hours | Electrolyte A | Electrolyte B |
| 3300 μf-25 VDC | 500 | +11.1 | +1.9 |
| 4700 μf-25 VDC | 1500 | +6.8 | No change |
| 2200 μf-40 VDC | 1500 | +10.9 | No change |
| 2700 μf-40 VDC | 1000 | +4.7 | −3.4 |

A possible explanation of the effectiveness of benzil in the electrolyte of this invention may have its origin in the less than well-understood phenomena of specific absorption, whereby benzil via its polar dicarbonyl functionality is absorbed on the capacitor's anode or cathode surface. This a true "terra incognita". We can surmise or hypothesize, but we can make no definite statements. The mechanism by which benzil achieves its beneficial effects is admittedly obscure, but the effect itself is clear and unambiguous, and we urge recognition of the combination of solute and benzil as used in electrolyte B.

The examples herein employ 1 wt. % of benzil because of the simplicity of preparation of the electrolyte, but amounts as high as 3 wt. % can be employed without loss of effectiveness. The use of the tetramethylammonium hydrogen phthalate as the solute for this invention was the result of a comparison with the triethylammonium hydrogen phthalate, wherein the electrolyte of this invention provided capacitors with stable properties and good life test results at both 105° and 125° C. whereas the comparison electrolyte was satisfactory at 105° C. but showed strong instabilities at 125° C.

What is claimed is:

1. An electrolytic capacitor comprising spaced aluminum electrodes, an electrolyte contacting said electrodes, said electrolyte having an organic solvent and a phthalate solute with from about 1 wt. % to about 3 wt. % benzil.

2. The capacitor of claim 1 wherein said solute is tetramethylammonium hydrogen phthalate, and said benzil is present at about 1 wt. %.

3. The capacitor of claim 1 wherein said solvent is γ butyrolactone with about 1 wt. % water.

4. The capacitor of claim 1 wherein said electrolyte consists essentially of (by wt. %), 22 wt. % tetramethylammonium hydrogen phthalate, 1 wt. % water, 1 wt. % benzil, and 76 wt. % γ butyrolactone.

* * * * *